2,424,469

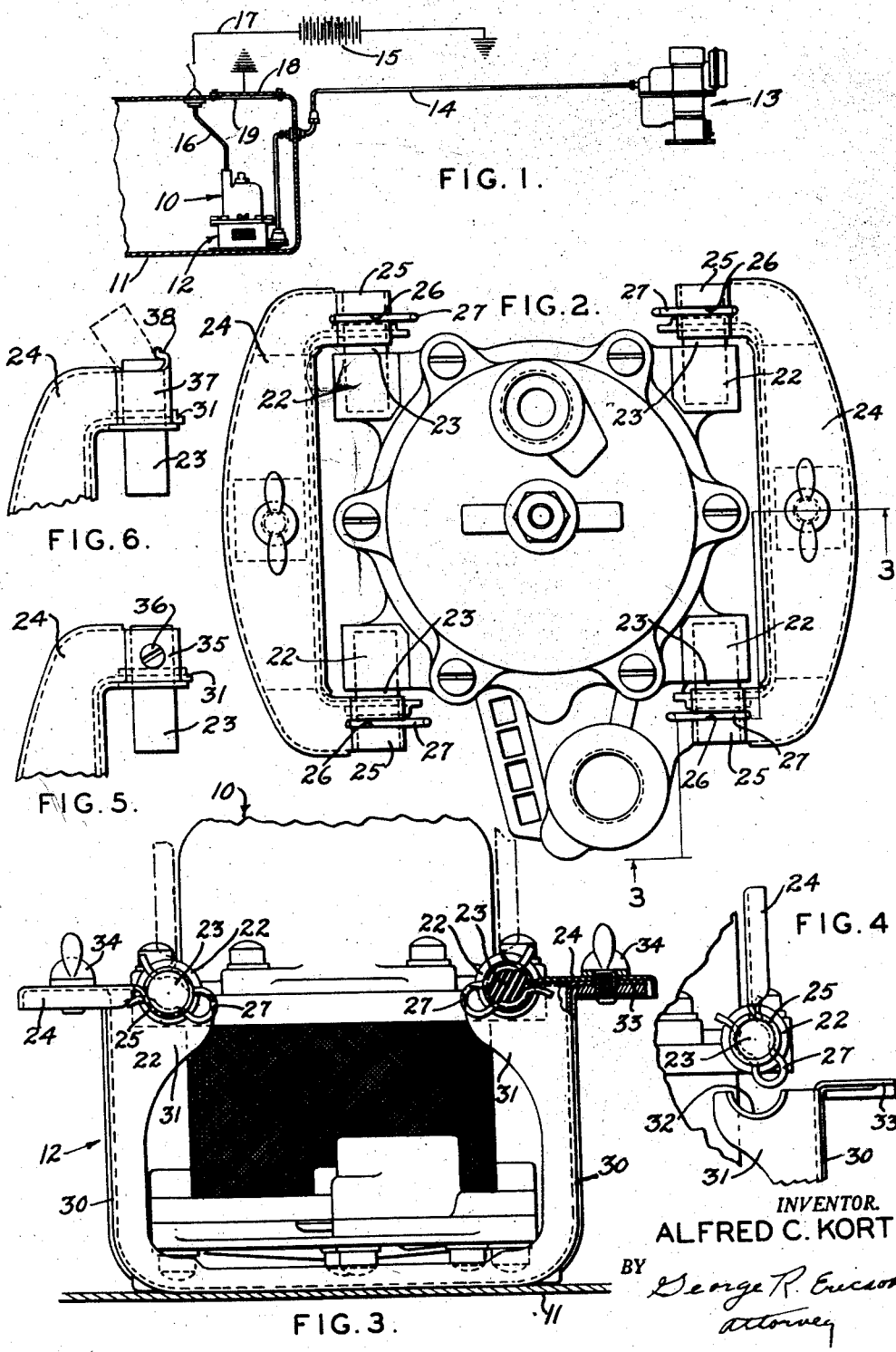
July 22, 1947.  A. C. KORTE  2,424,469
PUMP MOUNTING
Filed May 27, 1944
INVENTOR.
ALFRED C. KORTE Patented July 22, 1947

UNITED STATES PATENT OFFICE 2,424,469

PUMP MOUNTING

Alfred C. Korte, St. Louis, Mo., assignor to Carter Carburetor Corporation, St. Louis, Mo., a corporation of Delaware Application May 27, 1944, Serial No. 537,552

7 Claims. (Cl. 248—15)

This invention relates to resilient mountings for devices subject to vibration during operation and consists more particularly in a novel mounting for an electric fuel pump which is carried inside the fuel tank.

My Patent 2,271,560 shows an effective anti-vibration mounting for this type of fuel pump. However, the assembling of the various mounting parts, after the pump is inserted into the tank, is rather difficult, especially since these operations must be performed by an operator reaching through a small hole in the tank wall.

It is an object of the present invention to provide an anti-vibration mounting for this type of fuel pump, with means to facilitate application and attachment of the pump to its mounting cradle.

This object and other more detailed objects hereafter appearing are attained substantially by the structure illustrated in the accompanying drawing in which:

Fig. 1 is a diagrammatic view showing the pump installed in a fuel tank and connected to an internal combustion engine carburetor.

Fig. 2 is an enlarged top view of the pump and mounting structure.

Fig. 3 is a side view of the same taken in part on section line 3—3 of Fig. 2.

Fig. 4 is a disassembled view of a detail of the mounting structure.

Figs. 5 and 6 are detail views showing other means of mounting the rubber trunnions in the extremities of the yokes.

Fig. 1 shows an electric fuel pump, generally designated at 10, supported within fuel tank 11 upon a mounting cradle, generally designated at 12, and connected to carburetor 13 by tubing 14. An electrical connection to storage battery 15 is made by means of cable 16 and wire 17, both the pump motor and battery being grounded for completing the circuit. A plate 18 covers opening 19 in the top of the tank through which the fuel pump is inserted.

The pump body has formed integral therewith four externally opening cups 22, each of which receives a rubber trunnion 23. A pair of flanged yokes 24, each has apertured, cylindrical extremities 25 receiving the projecting portions of a pair of these trunnions. Each extremity 25 has opposed, circumferential slots 26 extending partly therearound in which is inserted a resilient, hair-pin-like wire 27 which grips the enclosed rubber so that the assembly of the yoke, trunnion, and pump body is firmly maintained, while the yokes are permitted to swing about the axes of the pairs of cups 22. The wire clips 27 also cause the trunnions to swell so as to firmly seat in the yoke extremities.

The mounting cradle is secured, as by welding, to the bottom of the tank and includes upright corner posts 30. Each post 30 has an inwardly projecting lug 31 with an upwardly opening, semicircular recess 32 for stably receiving the cylindrical under surface of one of the apertured yoke extremities (see Fig. 4). Each pair of posts 30 is connected by an outward, horizontal flange 33.

The yokes are flanged as best shown in Fig. 3 and, in their vertical positions, indicated by broken lines in this figure, are conveniently positioned to form gripping handles to facilitate insertion of the pump and mounting through opening 19. The vertical disposition of the yokes also reduces the lateral extent of the pump and, consequently, the necessary size of the tank opening.

After the pump is applied to the mounting cradle with all of the cylindrical extremities 25 firmly seated in recesses 32, yokes 24 are swung outwardly so as to lie upon cradle flanges 33. The yokes and flanges are then secured together by wing bolts 34 to maintain the assembly. Since only two of the wing bolts are required to secure the pump in position and these may be easily reached by the operator, the pump may be quickly and easily mounted. The edge flanges of yokes 24 rather snugly follow the contour of cradle flanges 33 to provide additional stability.

In Fig. 5, rubber trunnion 23 is secured in yoke extremity 35 by a screw 36 threaded into the yoke. Embedding of the screw against the trunnion causes the rubber to swell so as to tightly fill the yoke eye.

In Fig. 6, yoke eye 37 is provided with a small tongue 38. Trunnion 23 is distorted as indicated in broken lines for insertion into the yoke eye. The trunnion is made a little longer than the space between the pump casing and tongue 38 so that the trunnion is longitudinally compressed and thereby radially swelled in the assembly to snugly fit the yoke eye.

The invention may be modified in details as will occur to those skilled in the art and the exclusive use of all modifications as come within the scope of the intended claims is contemplated.

I claim:

1. Fuel pump mounting structure comprising spaced, resilient trunnions projecting from the pump body, a yoke having apertured extremities securely receiving said trunnions and maintaining them in position, a cradle having recesses for stably receiving said extremities, and securing means interposed between said extremities and engageable with said yoke and cradle.

2. Fuel pump mounting structure comprising pairs of spaced trunnions projecting from the pump body, yokes each having apertured, cylindrical extremities receiving a pair of said trunnions, a cradle having recesses for stably positioning said extremities and having outwardly projecting attaching surfaces, said yokes being swingable to positions aligned with the pump wall, to reduce the lateral extent thereof and thereby facilitate application of the pump to said cradle, and said yokes also being swingable to outwardly projecting positions, and means for attaching said yokes to said surfaces.

3. Mounting structure as described in claim 2 and which said yokes have finger grip portions disposed, when said yoke is aligned with the pump walls, to provide convenient hand gripping members to facilitate application to and removal from said cradle.

4. In combination, a tank having an opening in a wall thereof, a fuel pump having a handle yoke with its extremities pivoted to the pump body and swingable to a position substantially aligned with the wall of the pump body to facilitate insertion and withdrawal through said opening, a cradle mounted on another wall of said tank and having recessed structure for stably receiving and positioning said pump and having an outwardly projecting securing part, said yoke being swingable outwardly of the pump body, after insertion through said opening, and means for attaching said yoke to said securing part.

5. Mounting structure for a device subject to vibration in operation comprising recesses in spaced walls of the device, rubber trunnions rotatably seated in said recesses, a handle yoke having apertured extremities receiving said trunnions, said extremities having circumferential slots, and spring wires inserted in said slots and gripping said trunnions to secure the latter in position.

6. Fuel pump mounting structure comprising a base for attachment to a tank inner wall and having outstanding spaced legs and flanges connecting pairs thereof, said legs having recesses, and handle yokes each pivotally mounted on the pump body and having cylindrical extremities seated in said recesses and attaching means, said yokes being swingable into substantial alignment with the pump body wall, to facilitate handling, and to outward positions for attachment of said means to said base flanges.

7. Mounting structure for a device subject to vibration in operation comprising spaced trunnion pockets in the wall of the device, a handle yoke having an eye adjacent to and axially aligned with each of said pockets, rubber trunnions having portions normally of smaller cross sections than said pockets and said eyes and initially loosely received therein, a bifurcated element embedded against the portion of each trunnion received in the adjacent eye and causing swelling of said portion to snugly fit said eye whereby said yoke may tilt while securely maintaining the assembly of said trunnions with the device, a cradle, and means located intermediate said eyes for securing said yoke to said cradle.

ALFRED C. KORTE.

REFERENCES CITED

The following references are of record in the file of this patent:

UNITED STATES PATENTS

| Number | Name | Date |
| --- | --- | --- |
| 2,271,560 | Korte et al. | Feb. 3, 1942 |
| 475,343 | Rice | May 24, 1892 |
| 2,095,931 | Kraft | Oct. 12, 1937 |